April 26, 1938.  F. H. AWIG  2,115,452
NUT TAPPER
Filed Aug. 31, 1936   2 Sheets-Sheet 1

INVENTOR.
FRANK H. AWIG
BY Frank D. Gray
ATTORNEY.

April 26, 1938.  F. H. AWIG  2,115,452
NUT TAPPER
Filed Aug. 31, 1936  2 Sheets-Sheet 2
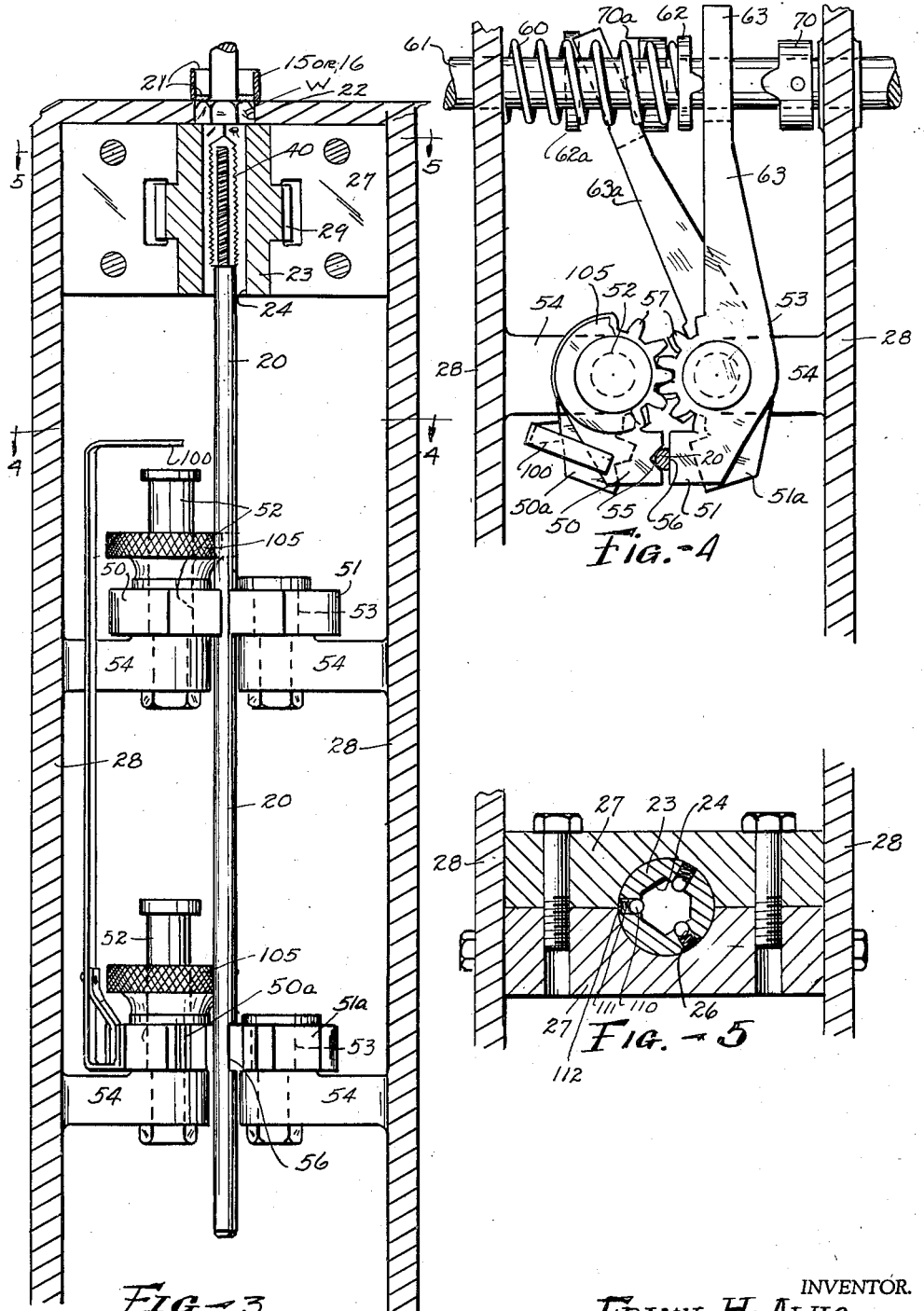
INVENTOR.
FRANK H. AWIG
BY Frank D. Gray
ATTORNEY.

Patented Apr. 26, 1938

2,115,452

UNITED STATES PATENT OFFICE 2,115,452

NUT TAPPER

Frank H. Awig, Cleveland, Ohio

Application August 31, 1936, Serial No. 98,670

5 Claims. (Cl. 10—133)

The invention relates to a nut tapping machine and especially to a machine which will be automatic in operation. This therefore is the general object of the present invention.

Another object of this invention is the provision of a nut tapping machine which will utilize a stationary tap and at the same time so arrange the mechanism that the actual tapping operation will be substantially continuous, that is, an arrangement which will discharge the tapped nut without interruption of the actual cutting operation A further object of this invention is to provide a nut tapping machine with an improved tap holding mechanism which is operable to permit discharge of the tapped nuts from the tap shank while other nuts are being tapped by the same tap.

Other objects of this invention will become more apparent from the following specification, reference being had to a preferred form of the invention which is illustrated in the accompanying drawings. The essential features of the invention will be summarized in the claims.

In the drawings Fig. 1 is a side elevation of a tapping machine embodying my invention;

Fig. 3 is an enlarged fragmentary section as indicated by the lines 3—3 of Fig. 1;

Figs. 4 and 5 are sectional details as indicated by the correspondingly numbered lines on Fig. 3.

Figure 1:
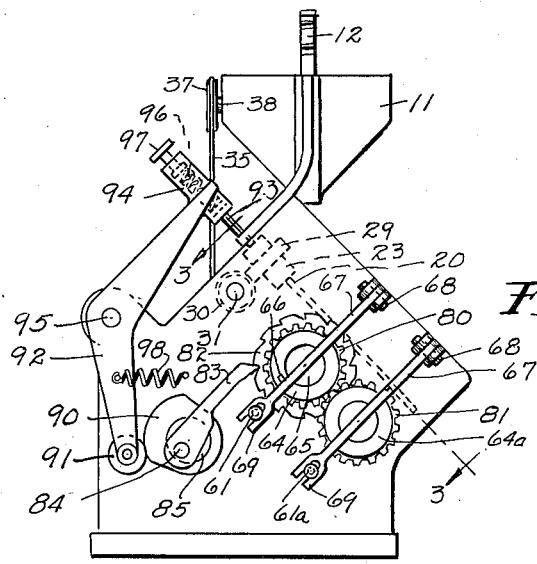

Referring again to the drawings I have indicated at 10 a boxlike machine frame open at its top. Mounted above and supported by the frame 10 is a nut hopper 11. Nuts supplied to this hopper are ejected one following another into a guideway 14 by a disc 12. In as much as such hopper and feed mechanisms are well known at the present time a detailed description of the hopper mechanism will not be given. Suffice it to say that a feeding disc 12 serves to keep the guideway 14 filled with nuts at all times.

The guideway 14 slopes downwardly from the hopper and is provided with two branches 15 and 16 which lead to the frame 10. The arrangement is such that the nuts progress from the hopper to the frame 10 under the influence of gravity. The machine illustrated in the drawings is provided with two tapping mechansms which operate simultaneously, one tapping mechanism being associated with each guideway. However it is within the scope of the present invention to provide one or any number of tapping mechanisms.

Each tapping mechanism is provided with a straight tap 20 which is held against rotation within the frame 10 as will be hereinafter more fully described. The lower end of each guideway is provided with openings 21 and the frame adjacent thereto is provided with a similar opening 22. The nuts descending in the guideway are shoved through these openings into the machine and into a nut chuck 23 which has an axial opening 24 extending therethrough. The openings 21, 22 and 24 are in axial alignment with each other and the tap 20. When hexagonal nuts are to be tapped, the opening in the nut chuck is also hexagonal and is of such size as to permit the nuts to be shoved or drawn thereto and at the same time permit relative rotation between the nuts and the chuck.

As illustrated in Figs. 3 and 5 the chuck has cylindrical end portions 26 which are journalled in a split bearing 27 which is secured between a pair of frame members 28. Intermediate the portions 26 the chuck is provided with a gear portion 29, the teeth of which drivingly mesh with a spiral gear 30, (Fig. 1) which is secured to a shaft 31. The shaft 31 is journalled in the frame 10, and, at the right hand side of the frame 10, is provided with a gear 32 which meshes with a gear 33 carried by a suitable shaft which extends outwardly from the machine frame. Drivingly connected with the gear 33 is a pulley 34 which may be driven from any suitable source of power.

The shaft 31 is also provided with a pulley 35, which through the medium of a belt 36 and pulleys 37 drives a hopper shaft 38. The shaft 38 is drivingly connected with the hopper disc 12 in the usual manner. This driving arrangement is such that the hopper mechanism as well as the nut chucks are constantly driven by the pulley 34.

Figure 2:
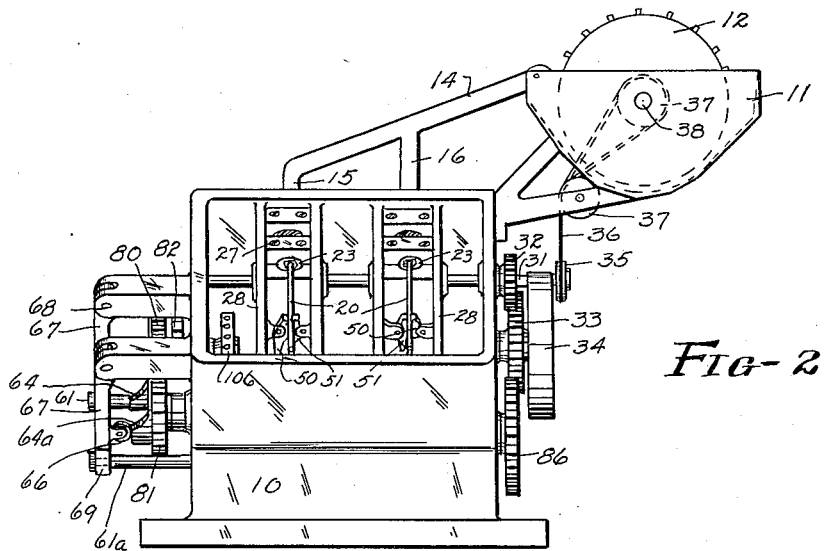
Fig. 2 is a front elevation of the machine shown in Fig. 1.

The tap is held stationary in the position shown in Figs. 1 and 2, with the thread cutting portions 40 thereof extending axially into the nut chuck. As shown two pairs of clamping jaws are provided, one pair below the other pair. The arrangement is such that as the nuts are rotated relative to the tap, the threads of the tap both thread the nuts and force them downwardly along the tap shank. As the nuts are forced from the chuck, by the action of the tap on subsequent nuts, they drop to the first pair of clamping jaws.

When a predetermined number of nuts are on the tap shank, above the top pair of clamping jaws, these jaws are opened permitting such nuts to drop to the second pair of jaws whereupon the first pair of jaws are closed and again grip the tap. After the first pair of jaws have closed, the second pair of jaws are opened permitting the nuts resting thereon to fall therebelow clear of the tap shank into a suitable receptacle (not shown), whereupon the lower pair of jaws are closed and brought into gripping engagement with the tap. This operation is then repeated until stopped by the operator.

As shown in Figs. 3 and 4, the upper set of clamping jaws include two jaws 50 and 51 which are pivotally mounted on respective studs 52 and 53 carried by frame bosses 54. The jaw 50 has a notch 55 which engages the tap shank while the jaw 52 engages a recessed flat surface 56 cut in the tap shank. The clamping jaws 50 and 51 are provided with interengaging teeth 57 so that the rotation of the jaw 51 about its pivot to clamp and unclamp the tap rotates the jaw 50 about its pivot to cause it to engage or disengage the tap.

The jaws 50 and 51 are normally maintained in engagement with the tap by a comparatively heavy compression spring 60 which encircles a shaft 61 carried by the frame 10. The spring is disposed between a frame wall 28 and a collar 62 which slidingly embraces the shaft and is maintained in engagement with forked ends of an arm 63 formed integral with the jaw 51.

The jaws are periodically opened by a cam 64, (Figs. 1 and 2). This cam is rotatably mounted on a shaft 65 carried by the machine frame. The cam coacts with a roller 66 carried by a lever 67 which is pivoted to the frame 10 as at 68. The lower end of the lever is forked as indicated at 69 and engages a reduced portion of the shaft 61 heretofore mentioned. The cam is so arranged as to periodically reciprocate the shaft 61 axially. The axial movement of the shaft 61 toward the left in Figs. 2 and 4, causes a collar 70 to engage the arm 63 of the jaw 51 and rock it counterclockwise against the action of the spring 60 thus opening the jaws 50 and 51. A suitable spring (not shown) maintains the roller 66 in contact with the cam 64.

The lower pair of jaws 59a and 51a are similar in all respects to the jaws 50 and 51. The lower jaw 51a is provided with a forked lever 63a which is operated by a spring (not shown), but similar to the spring 60 and a collar 70a carried by a shaft 61a in the same manner as heretofore described in connection with the upper clamping jaws. Likewise the shaft 61a is periodically reciprocated by a cam 64a as heretofore described in connection with the shaft 61.

The cams 64 and 64a are periodically advanced in timed relationship to each other and to the rotary movement of the nut chuck. As shown in Fig. 1, I secure a gear 80 to the cam 64 and a coacting gear 81 to the cam 64a. I also secure a ratchet wheel 82 to the cam 64. This ratchet wheel is periodically advanced by a pawl 83 carried by an eccentric portion 84 of a shaft 85 which is journalled in the frame 10. As indicated this shaft extends through the frame and is provided at its right hand end (Fig. 2) with a gear 86 which meshes with the gear 33 heretofore described.

The shaft 84 is provided, as shown in Fig. 1, with a cam 90 which coacts with a roller 91 carried by a lever 92. The lever 92 is pivoted to the frame 10, as at 95 and at its upper end is provided with a hollow arm 94. This arm carries a plunger 93 which aligns with the opening in the guideway 15, or 16 and consequent upon the rocking of the lever 92 shoves a nut from the guideway onto the tap. A suitable spring 98 maintains the roller 91 in contact with the cam 90.

The nuts are resiliently urged onto the tap and pressure is maintained on the nut until it has been firmly engaged by the tap. To this end the plunger 93 is slidably mounted in the lever arm 94 and is urged toward the tap by a spring 96 carried within the hollow bracket. An adjusting screw 97 is provided to control the pressure of the spring.

When tapping nuts of a minimum thickness, nuts are discharged from the nut chuck with rapidity. Under such conditions, and when the machine is operated at high speeds a nut may be caught by the closing upper tap jaws, and prevent their gripping the tap. To eliminate this condition I may provide the lower clamp jaw 50a with an upwardly extending arm or guard 100 which is bent inwardly toward the tap midway between the upper jaws and the nut chuck.

When the guard 100 is used the nuts drop from the chuck onto the guard, and when the lower jaws open such nuts drop onto the upper jaws. When the lower jaws close the guard is again moved into position to interrupt the passage of nuts W to the upper jaws. Hence the upper jaws may open and close without danger of fouling a nut. The guard 100 is preferably somewhat resilient so that even though it fouls on a nut the lower jaws 50a and 51a will effectively close.

The jaws 51 and 51a are arranged to permit any tap to be readily replaced without interrupting the operation of other taps in the machine. To this end the jaw 50 is provided with a knob 105 by means of which it may be grasped while open and slid upwardly out of engagement with its coacting jaw whereupon the cam mechanism may be rotated by a hand wheel 106 (Fig. 2) and the jaw 50a may be similarly moved out of engagement with its coacting jaw. This permits removal of the tap 20 without stopping the rotation of any of the nut chucks 23 in the machine and without disturbing the jaw operating shafts 61, thereby permitting the change of one tap in the machine while the other taps in the same machine are actively tapping nuts. To prevent nuts from tilting in the chuck the jaws 50 and the chuck are provided with balls 110 which are pressed by springs 111 toward the nuts.

Having set forth the principles of my invention, and described and illustrated an embodiment thereof for practical use, what I claim and desire to secure by Letters Patent, is:—

1. A tapping machine comprising a rotating workholder, means to feed work to said workholder, means to secure a straight tap against rotation and in cooperating relationship with work held by said workholder, said last named means comprising two pivoted clamp members geared together, means operating on one clamp of each pair to alternately open the pairs of clamps, resilient means to normally maintain the clamps closed.

2. A tapping machine comprising a rotating workholder, means to feed work to said workholder, means to secure a straight tap against rotation and in cooperating relationship with work held by said workholder, said last named means comprising two spaced pairs of clamps, each pair of clamps comprising two pivoted clamp members geared together for simultaneous movement, means operating on one clamp of each pair to alternately open the pairs of clamps, resilient means to normally maintain the clamps closed, and means to move one clamp of each pair out of geared relationship with the other clamp of its respective pair to permit removal of the tap.

3. A tapping machine having a tap mounted to permit work to fall by gravity from the threaded portion of the tap along the tap shank, a frame means to support and secure the tap against rotation, said means including two spaced pairs of clamping jaws adapted and arranged to grip the tap shank intermediate its ends, means including segmental gears carried by respective jaws to couple the jaws of each pair together, pivotal connections between respective jaws and the frame, wherein one jaw of each pair of jaws is mounted for axial movement on its pivot to permit disengagement of the segmental gears and removal of the tap, means to open and close said clamping jaws, said means being arranged to alternately actuate the jaws of each pair whereby the tap shank is at all times gripped by the jaws of at least one pair.

4. A tapping machine comprising a rotating workholder, means to feed work to said workholder, means to secure a straight tap against rotation and in cooperating relationship with work held by said workholder, said last named means comprising two spaced pairs of clamps, each pair of clamps comprising two pivoted coacting clamp members geared together, means operating on one clamp of each pair to alternately open the pairs of clamps, resilient means to normally maintain the clamps closed, one clamp of each pair being mounted for axial movement on its pivot to permit one clamp of each pair to be moved out of coacting relationship with the other clamp of its respective pair to permit removal of the tap.

5. A tapping machine having a tap mounted to permit work to fall by gravity from the threaded portion of the tap along the tap shank, power operated means to rotate work pieces means to support and secure the tap against rotation, said means including a pair of coacting clamping jaws, resilient means to cause said jaws to grip the tap shank intermediate its ends and a second pair of coacting clamping jaws, resilient means to cause said last named jaws to grip the tap shank adjacent the end remote from the cutting portion of the tap, power operated means to periodically open and close said clamping jaws, said last named means being arranged to alternately actuate the jaws of each pair whereby the tap shank is at all times gripped by the jaws of at least one pair, and means whereby one jaw of each pair of jaws may be moved out of coacting relationship with the other jaw of its pair to permit replacement of the tap.

FRANK H. AWIG.